(12) United States Patent
Carrara et al.

(10) Patent No.: US 7,788,990 B2
(45) Date of Patent: Sep. 7, 2010

(54) LEVER DEVICE FOR OPERATING A HYDRAULIC ACTUATOR

(75) Inventors: Marco Carrara, Cassano D'Adda (IT); Beniamin Szewczyk, Dalmine (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 373 days.

(21) Appl. No.: 11/553,157

(22) Filed: Oct. 26, 2006

(65) Prior Publication Data
US 2007/0158155 A1 Jul. 12, 2007

(30) Foreign Application Priority Data
Nov. 23, 2005 (IT) .......................... MI2005A2240

(51) Int. Cl.
*F16C 1/10* (2006.01)
*B64C 13/30* (2006.01)
*G05G 1/04* (2006.01)

(52) U.S. Cl. .................... 74/502.2; 74/501.5 H; 74/525

(58) Field of Classification Search ................ 74/500.5, 74/501.5, 501.5 H, 501.6, 502.2, 525, 551.1, 74/551.3; 180/219, 315, 334, 230, 218
See application file for complete search history.

(56) References Cited

U.S. PATENT DOCUMENTS 2,824,434 A * 2/1958 Stern ........................... 464/88
2,908,150 A * 10/1959 Stern ........................... 464/88
3,212,526 A * 10/1965 Williams et al. ......... 137/625.41
3,770,926 A * 11/1973 Wanner ...................... 200/325
5,525,146 A * 6/1996 Straub .......................... 96/214
5,625,336 A * 4/1997 Yamamoto .................. 340/432
6,390,505 B1 * 5/2002 Wilson ....................... 280/775
6,943,523 B2 * 9/2005 Feres ......................... 318/696
2003/0183038 A1 * 10/2003 Cornolti et al. ............... 74/525

FOREIGN PATENT DOCUMENTS

EP 1160152 12/2001
WO 2006/030379 3/2006

* cited by examiner

*Primary Examiner*—Thomas R Hannon
*Assistant Examiner*—James Pilkington
(74) *Attorney, Agent, or Firm*—Shoemaker and Mattare (57) ABSTRACT

A lever device for operating a hydraulic actuator for a motorcycle comprises a support, a hydraulic actuator connected to the support, a main lever pivotally connected to the support for movement toward or away from the hydraulic actuator, and a timing lever pivotally connected to the support and connected to the main lever so as to operate the hydraulic actuator. An adjusting member is interposed between the main lever and the timing lever defines the relative position between the levers. An electric actuator changes the position of the adjusting member as a function of an electric power supplied to the actuator from a manually adjustable power supply.

17 Claims, 8 Drawing Sheets

LEVER DEVICE FOR OPERATING A HYDRAULIC ACTUATOR

FIELD OF INVENTION

The present invention relates to a lever device for operating a hydraulic actuator, particularly the pump of the braking system or hydraulic clutch of a motorcycle.

Only to the purpose of simplifying the disclosure of the present invention, the following description will be made with reference to a manual control lever associated with the handlebar of a motorcycle and intended to operate the braking system pump, which will be designated below as the brake lever.

BACKGROUND OF INVENTION

In motorcycles, the brake lever is known to be placed at the right end of the handlebar, in the vicinity of the grip and guide knob to which the control of the accelerator is associated.

It is also known that the position of the brake lever, and more particularly, the distance of the same from the handlebar knob, is very often unsuitable to the actual requirements of many users because of each one's anthropometric differences.

In order to be capable of adjusting the position of the brake lever, adjusting devices have been proposed, which allow adjusting the position of the brake lever relative to the hydraulic actuator, and accordingly also relative to the grip knob on the motorcycle handlebar.

The known lever devices comprise a main lever and a timing lever being operatively associated thereto for operating the pump of the braking system while the main lever is moving close to the grip knob on the handlebar. The main lever and the timing lever are connected to each other by a threaded pin, which by being rotated allows adjusting the position of the main lever relative to the timing lever and accordingly the distance between the grip knob on the handlebar and the main lever on which the user manually acts for braking.

Said lever devices have the drawback that they allow adjusting the position of the main lever only when the motorcycle is stopped. In fact, the user is necessarily required to remove his/her hand from the handlebar in order to reach and turn the threaded pin.

Particularly, when a motorcycle racer is engaged in a race, the fact of being obliged to stop in order to carry out an adjustment or the only fact of removing his/her hand from the motorcycle handlebar is inadmissible.

Also in relation to normal applications, it is also not desirable for the motorcyclist to be forced to remove his/her hand from the handlebar in order to be able of carrying out an adjustment on the lever position.

To avoid this problem, it has been suggested to use a remotely-operated control system, which comprises a flexible cable suitable to transmit a torsional moment for controlling the rotation of the threaded pin. In the vicinity of the point of connection to the threaded pin, however, the flexible cable is required to carry out at least 90° short-range fold, which introduces friction, irregularity and inaccuracy in the operation of the adjusting device.

GENERAL DESCRIPTION OF THE INVENTION

The object of the present invention is, accordingly, to provide a lever device for operating a hydraulic actuator, such as a motorcycle brake lever, having such characteristics as to avoid the drawbacks cited with reference to the prior art.

This object is achieved by means of a lever device for operating a hydraulic actuator according to claim 1.

Due to the electric actuator, all the problems concerning the mechanical transmission of the adjusting motion to the adjusting member are advantageously avoided. As a connection for the transmission of electric, electromagnetic or optical signals from the manual operating member to the electric actuator is independent of the space conditions and arrangement of the adjusting member relative to the handlebar and relative to the manual operating member, the latter can be positioned according to the motorcyclist's requirements, for example also on the handlebar at the left knob, such as to be operated by the left thumb, for example.

BRIEF DESCRIPTION OF THE FIGURES

In order to better understand the invention and appreciate the advantages thereof, several exemplary non-limiting embodiments of the same will be described below, with reference to the annexed drawings, in which.

DETAILED DESCRIPTION OF EMBODIMENTS

With reference to the figures, with 1 has been generally designated a lever device for operating a hydraulic actuator 3, such as the brake pump of a braking system or hydraulic clutch of a motorcycle. In the example referred to herein, the operating lever is the manual control lever associated to a motorcycle handlebar 4 (only partially indicated with the dotted line in the figure). By acting thereon, the brake pump 3 of the braking system can be operated. Said lever will be referred to below as the brake lever 2. The brake lever 2 is known to be placed at the right end of the motorcycle handlebar, in the vicinity of the grip knob to which the accelerator control is associated.

The lever device 1 comprises a support 5 being provided with means for integral connection to a bearing structure, which in the example is the motorcycle handlebar 4.

Figure 1:
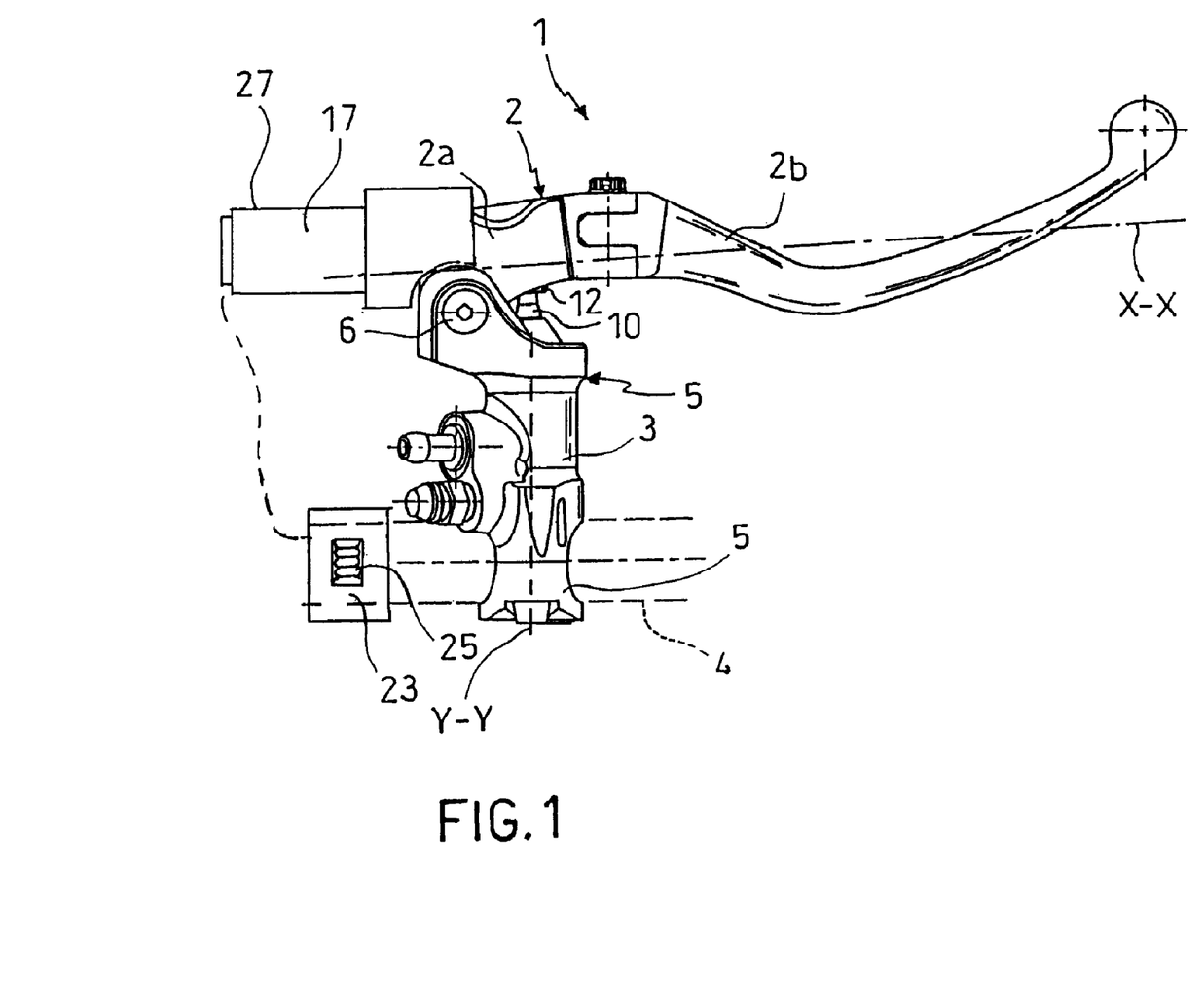
FIG. 1 is a plan view of an lever device according to the invention.

The brake lever 2 comprises a head 2a from which a tapered part 2b extends in a main longitudinal direction X-X. The tapered part is intended to be grasped by a user of the motorcycle with the fingers of his/her hands, while his/her palm is rested on the corresponding grip knob on the handlebar. The tapered part 2b of the brake lever 2 is shaped according to a curved line such as to be ergonomic and facilitate the grip of the same. In the present description, by "longitudinal direction X-X" is intended to mean that direction defined by the straight line passing through the head 2a of the brake lever 2 and interpolating the development of the tapered part 2b (FIG. 1).

In the example in the figure, the head 2a and the tapered part 2b of the brake lever 2 are two distinct parts that are joined to each other by means of a connection screw. The brake lever 2 can, however, be also provided as one piece.

The head 2a of the brake lever 2 is pivotally mounted on the support 5 by means of a pin 6, such as to be angularly movable close to and away from the corresponding grip knob on the handlebar 4. The pin 6 extends in a direction Z-Z substantially coincident with the normal to the plane passing through the brake lever 2 and handlebar 4 (i.e. normal to the plane of the drawing in FIGS. 1 and 2).

The brake pump 3 is integral with the support 5, and in the example, is positioned such that the piston contained therein is movable in a transversal direction Y-Y directed from the handlebar 4 to the brake lever 2, between a rest end-of-stroke position (FIG. 2) in which the piston 7 is pushed by a counter-spring 8, and a forward operative position to which the piston 7 moves when the brake pump 3 is operated counteracting the action of the counter-spring 8 and the pressure of the brake fluid contained in the body of the brake pump 3. Particularly, when shifting from the rest end-of-stroke position to the forward position, the piston 7 moves in the transversal direction Y-Y in the sense of moving close to the handlebar 4.

A control rod 10 substantially extending in the transversal direction Y-Y and projecting from the end facing the brake lever 2 of the body of the brake pump 3 is connected to the piston 7. By acting on the control rod 10 with a preset axial force, the operation of the brake pump 3 is obtained, i.e. the forward movement of the piston 7 from the rest end-of-stroke position to a forward position.

In an entirely conventional manner, the brake pump 3 is provided with inlet and outlet ports for hydraulic fluid. The rest end-of-stroke position of the piston 7 is adjusted such that, in this position, the piston 7 does not occlude the inlet port for the hydraulic fluid of the brake pump 3.

From what has been discussed above, it may be appreciated that the movement of the brake lever 2 close to/away from the grip knob on the handlebar 4 also defines the simultaneous movement of the brake lever close to/away from the brake pump 3, respectively.

The lever device 1 also comprises a timing lever 9, which is hinged to the support 5 and operatively associated to, preferably pivotally connected to, the brake lever 2 in order to act on the control rod 10 and operate the brake pump 3 while the brake lever 2 is moving towards to the brake pump.

Preferably, the timing lever 9 is aligned to the brake lever 2 and is hinged to the support 5 at the pin 6, such as to move together with the brake lever 2 close to and away from the brake pump 3, and accordingly the grip knob on the handlebar 4.

Figure 2:
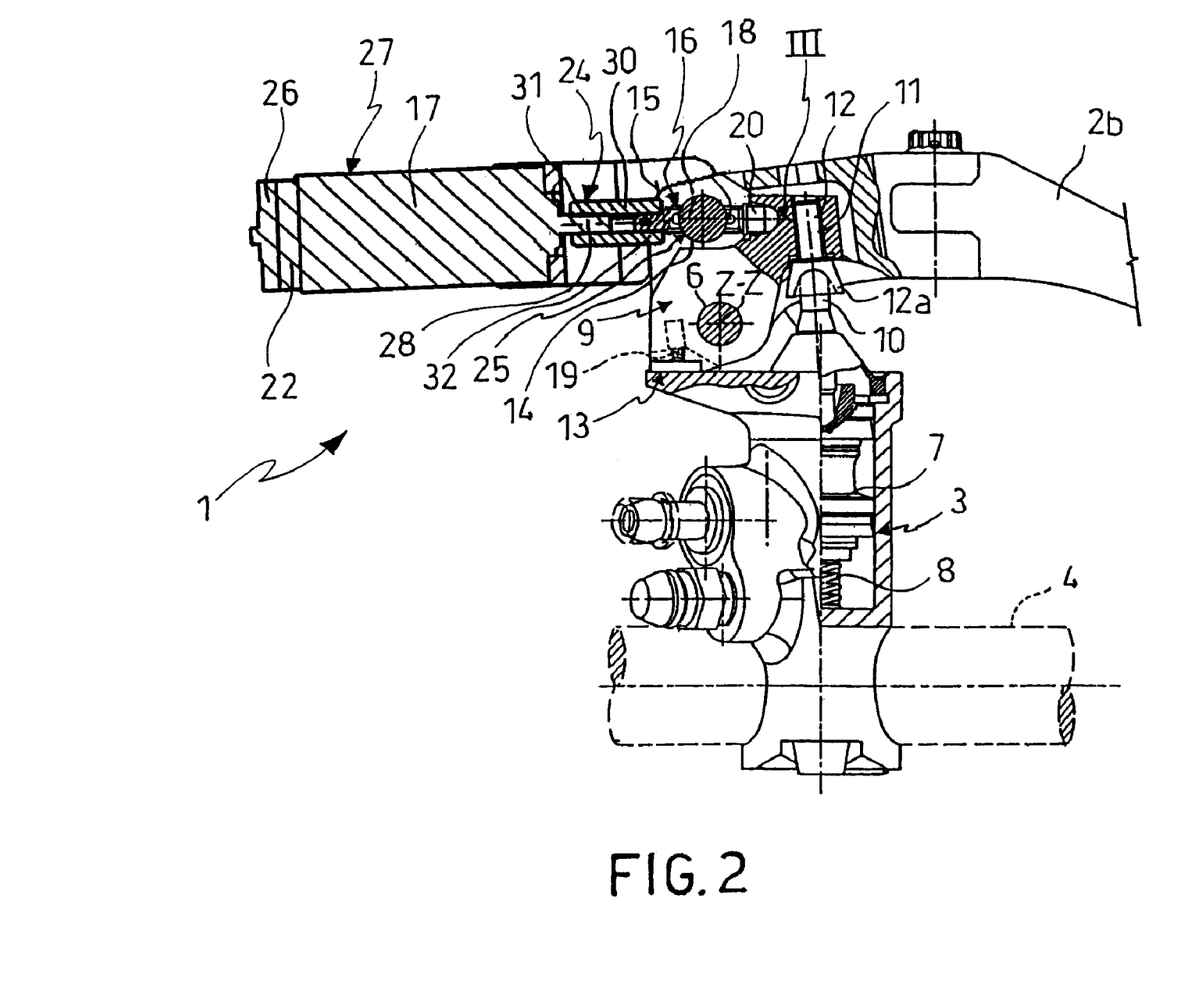
FIG. 2 is a partially sectioned plan view of the lever device from FIG. 1.
Figures 3, 4:
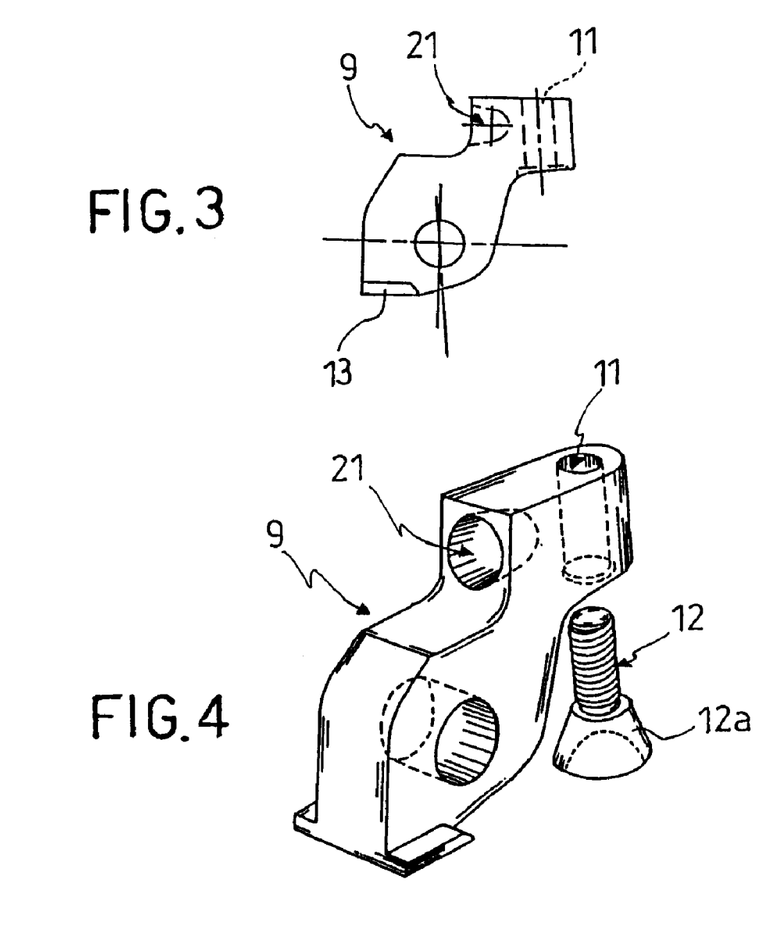
FIG. 3 is a plan view of the device from FIG. 1.
FIG. 4 is a perspective view of the detail from FIG. 3.
Figure 5:
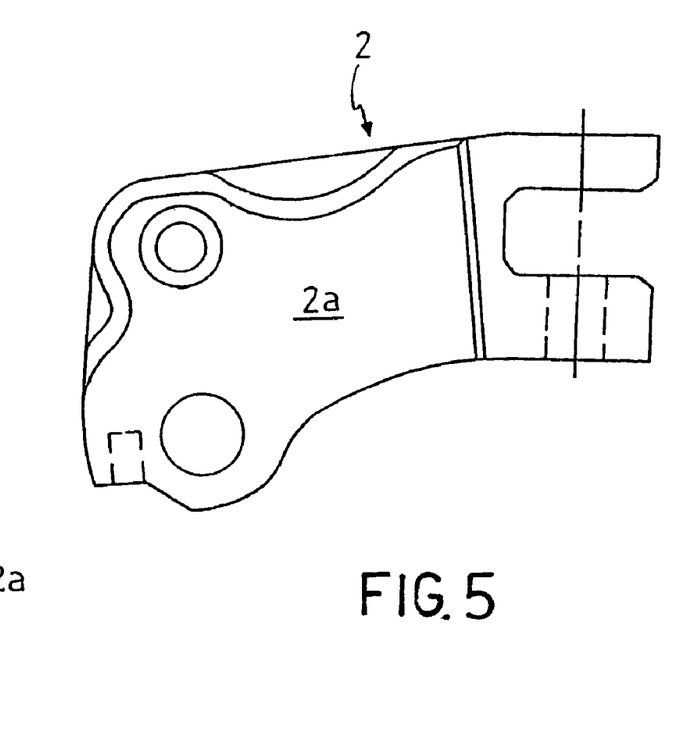
FIG. 5 is a plan view of a detail of a further detail of the device from FIG. 1.
Figure 6:
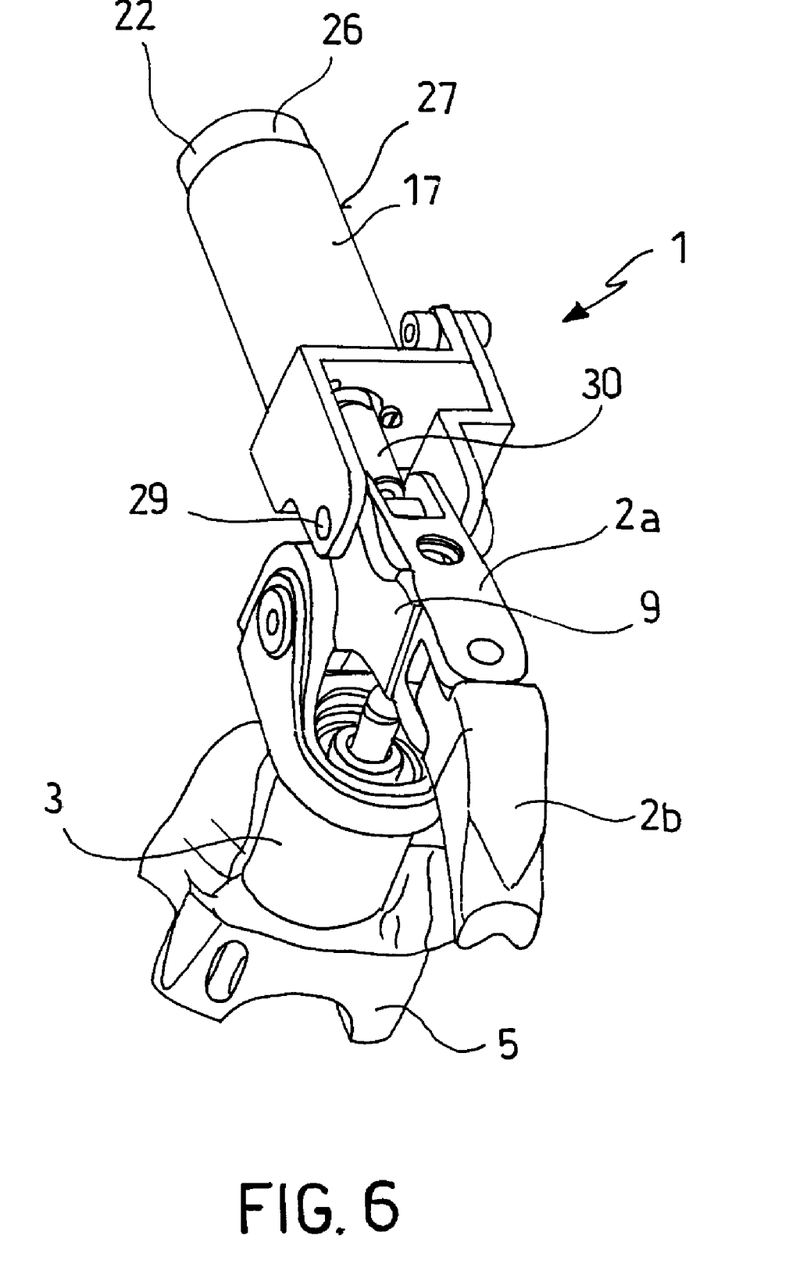
FIG. 6 is a perspective view of a detail of the device from FIG. 1.
Figure 7:
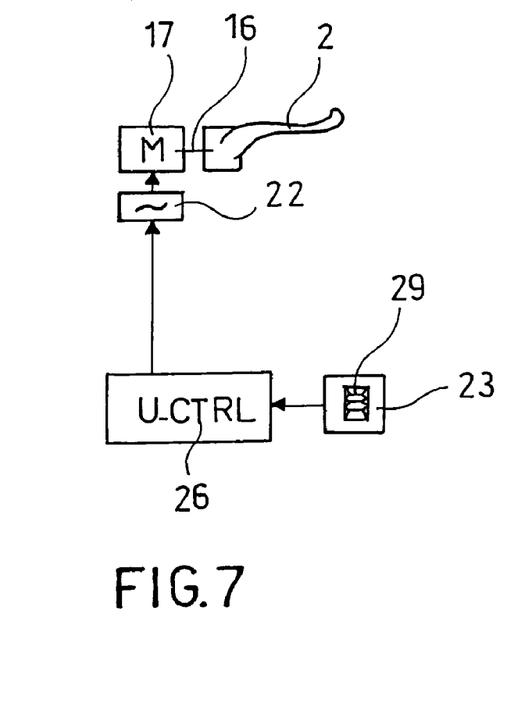
FIG. 7 is a schematic illustration of the assembly and operation of a device according to an embodiment of the invention.
Figure 8:
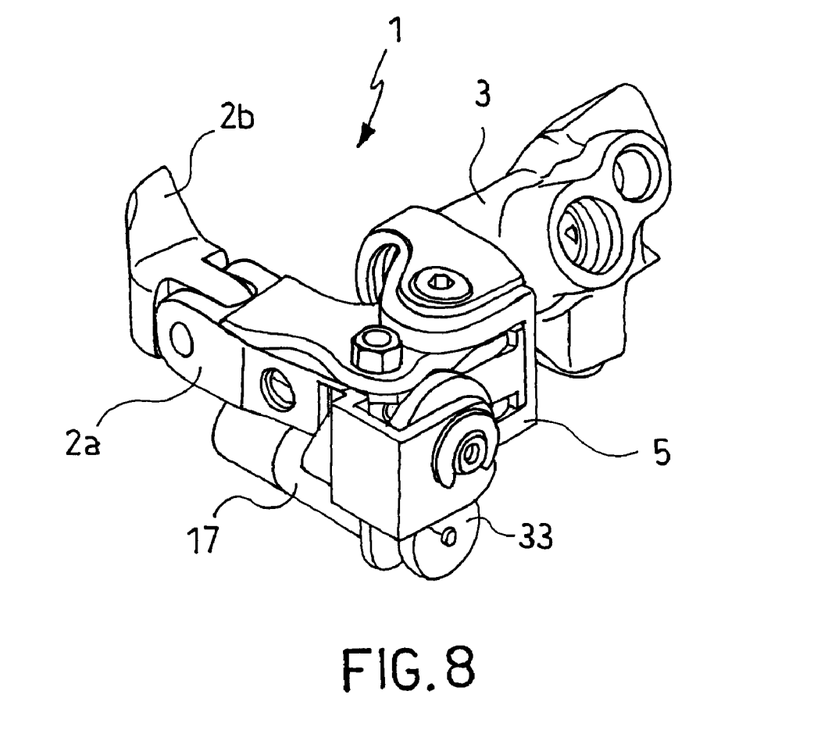
FIG. 8 is a perspective view of a further embodiment of the invention.
Figure 9:
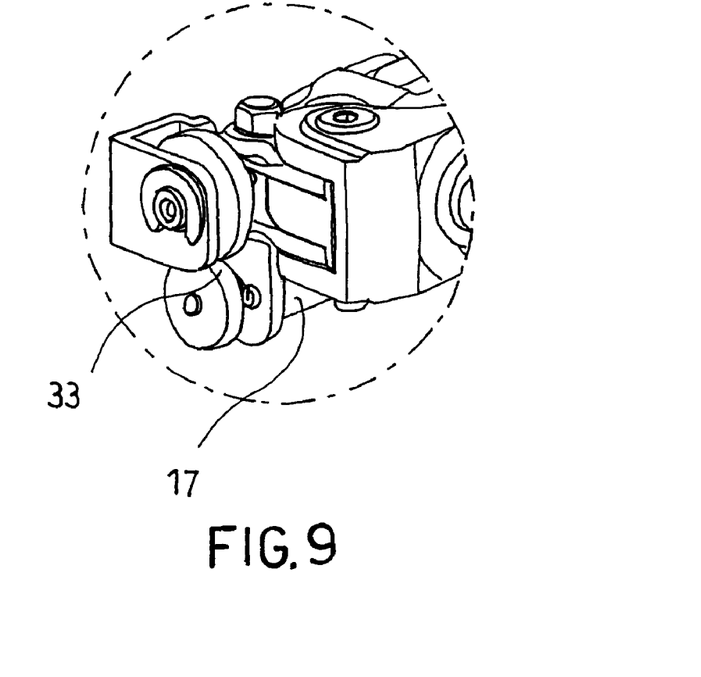
FIG. 9 is an enlarged view of a detail from FIG. 8.
Figure 10:
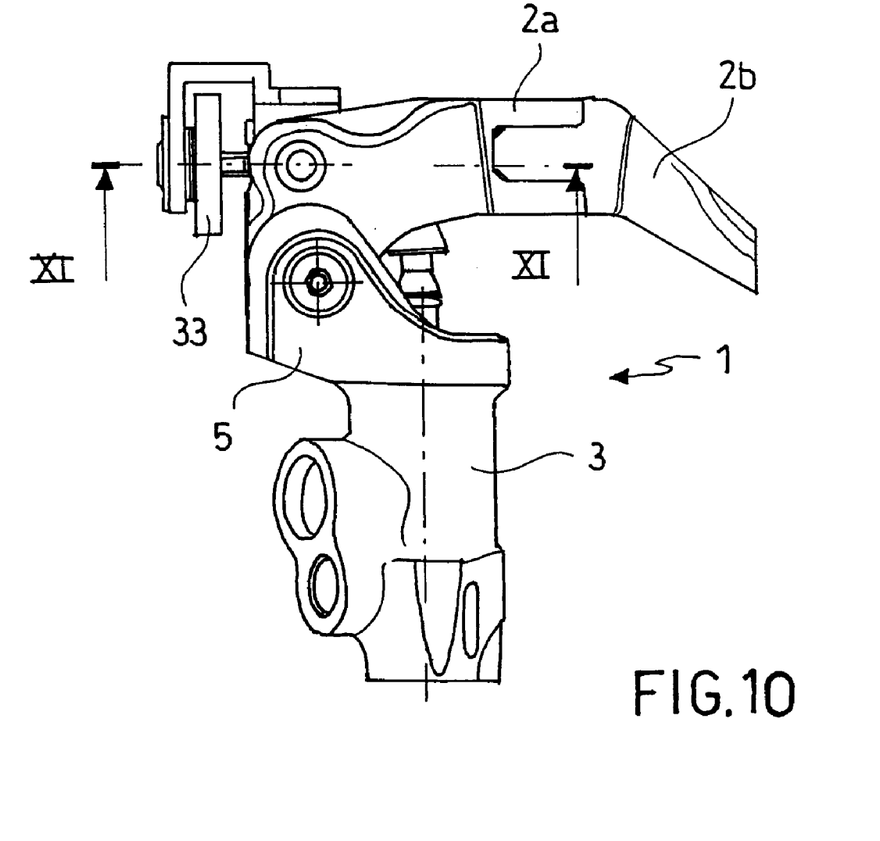
FIG. 10 is a plan view of the device according to the embodiment as shown in FIG. 8.
Figure 11:
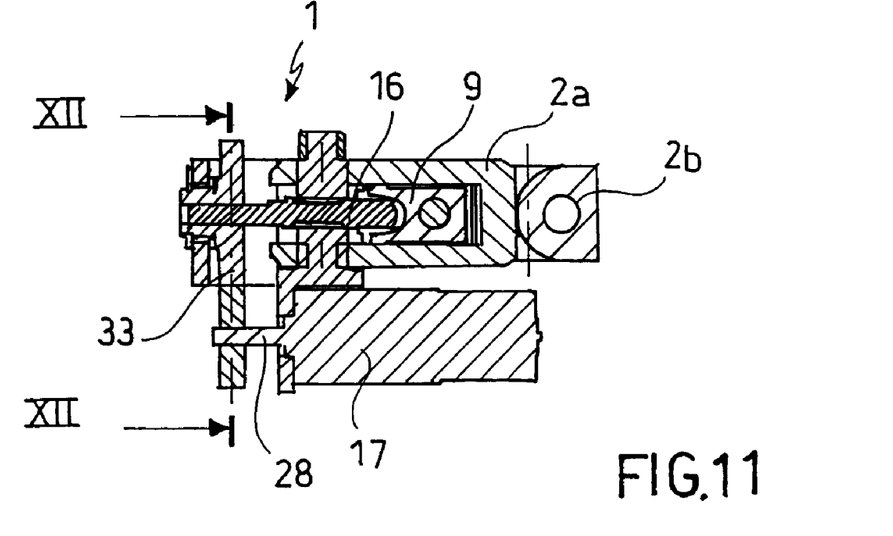
FIG. 11 is a sectional view according to line XI-XI from FIG. 10.
Figure 12:
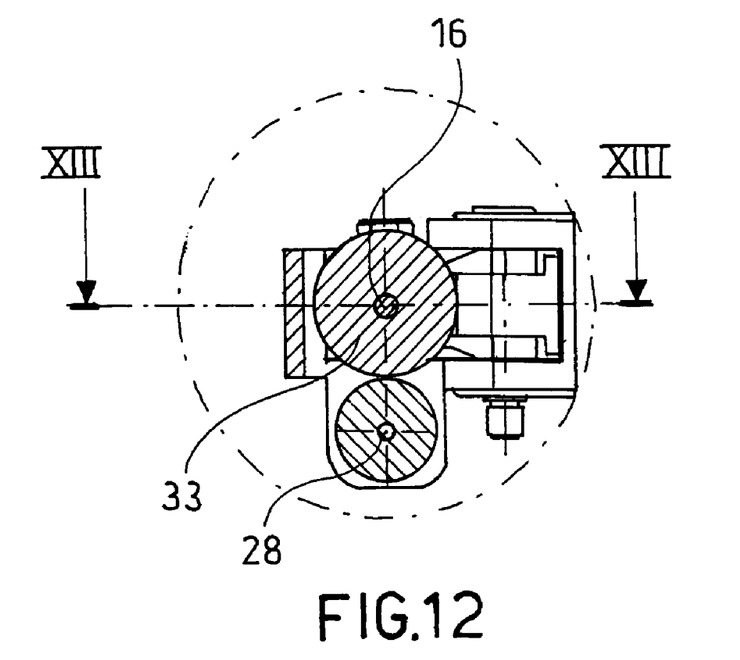
FIG. 12 is an enlarged sectional view according to line XII-XII from FIG. 11.
Figure 13:
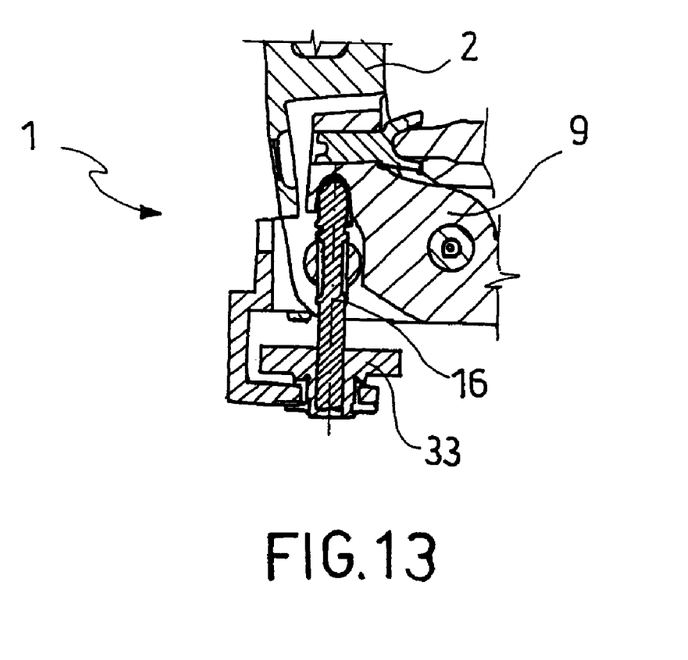
FIG. 13 is a sectional view according to line XIII-XIII from FIG. 12.

The rear portion of the timing lever 9 has an abutment plane 13, which is intended to be a stop for the rotation of the timing lever 9 about the pin 6 in the movement away from the brake pump 3 (counter-clockwise with reference to FIGS. 1 and 2). In fact, when the timing lever 9 is rotated away from the brake pump 3, the abutment plane 13 comes to interfere with the support 5 and abuts against the latter in an end-of-stroke position.

The action applied by the counter spring 8 on the piston 7 of the brake pump 3 causes the control rod 10 to act on the timing lever 9 in the sense that it holds the abutment plane 13 thereof into abutment against the support 5 with a preset elastic load.

Preferably, in the timing lever 9 is formed a threaded through hole 11 in which the threaded stem of an adjusting screw 12 is screw-engaged. The adjusting screw 12 has a head 12a protruding from the timing lever 9, and on which the end of the control rod 10 acts. Consequently, when the adjusting screw 12 is tightened or released on the timing lever 9, thus changing the distance of the head 12a from the timing lever 9, the position taken by the control rod 10 will be adjusted and said rest end-of-stroke position of the piston 7 will be also adjusted within the brake pump 3.

Preferably, the end of the control rod 10 which acts on the adjusting screw 12 is rounded, while in the head 12a of the adjusting screw 12 a semicircular flared recess is formed, which is suitable to accommodate said rounded end of the control rod 10.

Alternatively, the timing means used to adjust the relative position of the timing lever 9 relative to the brake pump 3, i.e. the rest end-of-stroke of the piston 7, can be provided with other functionally equivalent elements, such as a threaded dowel.

The rotation stop of the timing lever 9 and brake lever 2 moving close to (clockwise direction with reference to FIGS. 1 and 2) the brake pump 3 is determined by the maximum forward operating position allowed for the piston 7 before the latter comes to abut against the bottom of the body of the brake pump 3 or the counter-spring 8 is pack-compressed.

The lever device 1 is also provided with means 15 for adjusting the position of the brake lever 2 relative to the timing lever 9, i.e. the adjustment of the distance of the tapered part 2b of the brake lever 2 from the corresponding grip knob of the handlebar 4.

In the example, said means 15 for adjusting the position of the brake lever 2 relative to the timing lever 9 comprise an adjusting member, preferably a pin 16, which extends for example substantially in said longitudinal direction X-X. The pin 16 engages the brake lever 2 in an axially adjustable manner, in said longitudinal direction X-X in the example, and at the same time, is engaged in abutment against the timing lever 9 such that, a longitudinal displacement of the pin 16 relative to the brake lever 2 corresponds to a change in the position of the brake lever 2 relative to the timing lever 9.

The device 1 further comprises an electric actuator 17 to change the position of the adjusting member 16 as a function of an electric power supplied to the electric actuator 17 by means of supply means 22, which, in turn, interact with a manual operating member 23. Thereby, the operation of the manual operating member 23 determines the power supply to the electric actuator 17 that carries out the position adjustment on the adjusting member 16.

According to an embodiment, the electric actuator 17 comprises an electric motor and drive means 24 that transmit the motor movement, with a determined ratio, to the adjusting member 16. Advantageously, the electric motor is a stepping motor which allows a defined step width actuation, such as to provide a defined step width adjustment on the position of the main lever 2. In an exemplary stepping motor, said power supply means 22 preferably comprise one or more power stages.

Advantageously, the manual operating member 23 comprises a selector 25 that can be manually snap adjusted, such as a snap-shiftable cursor or a snap-rotatable wheel or a joystick-type lever-knob, or a button interacting with a device, such as a potentiometer, suitable to change or emit signals, such as electric signals, as a function of the adjustment direction and number of snaps carried out on the selector 25.

A control unit 26 is connected to the manual operating member 23 and with the power supply means 22 to be able to exchange signals therewith and pilot the power supply means 22 in dependency of signals received from the manual operating member 23. According to an embodiment, the control unit 26 is connected to the manual operating member 23 by means of an electric wiring allowing the manual operating member 23 to be positioned in a position which is independent from both the electric actuator 17 and control unit 26.

The control unit 26 turns the signals received from the manual operating member 23 (which are representative for the number of snaps and adjustment direction) into control signals for the power supply means 22, such that a determined number of operating snaps corresponds to a determined number of actuating steps of the stepping motor and an operating direction corresponds to a moving direction of the motor.

Advantageously, means are also provided for entering control and selection commands connected to the control unit, which allow for example to set the resolution, i.e. the fineness of the adjustment according to the requirements or preferences of the user. This adjustment resolution setting is implemented in the possibility of changing the ratio of the number of operating snaps of the manual selector to the corresponding number of actuating steps of the electric actuator.

In accordance with an embodiment, a signal emitter connected to the control unit emits a warning signal in case of malfunctioning of the adjusting system, such as a flashing LED.

In accordance with a further embodiment, the control unit is connected to a memory suitable to store adjusting positions for different users or different drive paths of the motorcycle. This pre-programmed adjusting positions can be selected by means of the means provided for interacting with the control unit, such as a keyboard or an individual push-button.

In accordance with a further embodiment, a pressure sensor is provided to be associated with the hydraulic pump and/or a position sensor of the main lever which provide the control unit with pressure and position data. Based on the data provided by the pressure and/or position sensors and the values either pre-programmed or selected by the user, the control unit is suitable to pilot the electric actuator such that the latter adjusts the position of the main lever in an entirely automatic manner.

According to an embodiment, the manual operating member 23 is placed in an independent position remote from the position of the adjusting member 16, particularly this manual operating member 23 is secured to the handlebar 4 of the motorcycle at the left handle, such as to be operated by means of the thumb of the left hand (which is not engaged in the actuation of the accelerator).

Advantageously, the control unit 26 is arranged within a housing 27 that also houses the electric actuator 17. Alternatively, the control unit 26 can be placed in an independent position remote from the electric actuator 17 and/or adjusting member 16.

According to the embodiment shown in FIGS. 1 and 2, the electric actuator 17 is secured to the timing lever 9. Alternatively, the electric actuator 17 can be secured to the main lever 2, and advantageously incorporated therein.

In accordance with a further embodiment, the electric actuator 17 is connected to the support 5 adjacent to the hydraulic actuator 3 and, in order to minimize the overall size of the lever device, the electric actuator 17 has an elongated shape which substantially extends in the longitudinal direction of actuation of the hydraulic actuator 3.

In accordance with a further embodiment, as shown in FIG. 8 to 13, the electric actuator 17 is arranged beside the main lever 2, preferably substantially entirely or at least for the most part within the longitudinal extension of the lever and such that the longitudinal axis of the actuator is substantially parallel to the plane of the main lever 2. Preferably, the drive shaft 28 is substantially parallel to the adjusting member 16 and the transmission, preferably with a gear ratio, of the rotary motion from the drive shaft 28 to the adjusting member 16 is carried out by means of mechanical drive means, such as a gear reducer 33, friction reducer or belt reducer being interposed between a drive shaft 28 and the adjusting member 16. This embodiment is particularly advantageous relative to a reduction in the overall size of the lever device.

According to a further embodiment (FIG. 2), the electric actuator 17, and particularly the rotor with drive shaft 28 thereof have a substantially parallel longitudinal axis, preferably coaxial to a longitudinal axis of the adjusting member 16. To be able of holding this parallel or coaxial position in the various adjustment configurations that imply displacements and/or rotations of the timing lever 9 relative to the main lever 2, compensation means are advantageously provided which are suitable to compensate misalignments between the adjusting member 16 and the electric actuator 17. These compensation means advantageously comprise a pivoting connection 29 of the electric actuator for example relative to the support 5 or timing lever 9, such that the orientation of the electric actuator 17 is defined by the orientation of the adjusting member 16 with which it is coupled.

With reference to the embodiment shown in FIG. 2, the rotor 28 or drive shaft of the electric actuator 17 is connected to the adjusting member 16 by means of a bush 30. The bush 30 comprises a first seat 31, such as polygonal, which provides a rotatably integral shape-coupling with the drive shaft and a second seat 32, such as polygonal, which provides a rotatably integral shape coupling with the adjusting member 16, and at least one of the first 31 and second 32 seats is a longitudinal guide for the drive shaft or adjusting member 16, respectively, such as to compensate also for the adjustment longitudinal displacements of the adjusting member 16 relative to the drive shaft of the actuator 17.

In an embodiment, the axially adjustable engagement, such as in the longitudinal direction X-X, of the pin 16 to the brake lever 2 is obtained due to the fact that the pin 16 has an outer thread that is screw-engaged within a threaded through hole 18 formed in a centering support 14. This centering support 14 axially extends in said vertical direction Z-Z and is hinged to the head 2a of the brake lever 2 such as to be able of rotating about its axis. Consequently, when the pin 16 is rotated relative to the centering support 14, the relative position of the pin 16 can be changed relative to the brake lever 2 in the longitudinal direction X-X.

The end 20 of the threaded pin 16 protruding from said through hole 1B is abutted against the timing lever 9. To the purpose, the lever device 1 comprises elastic means 19 acting on the head 2a of the brake lever 2 and the timing lever, in order to hold the end 20 of the threaded pin 16 in contact with the timing lever 9 with a preset elastic load. In the example, the elastic means 19 comprise a pair of helical springs 19, each acting between counter-posed end positions of the brake lever 2 and timing lever 9, in the sense of causing the brake lever 2 to rotate about the pin 6 towards to the brake pump 3 (clockwise with reference to FIGS. 1 and 2), thus recovering any clearance therebetween and preventing said levers from hitting against each other in the presence of vibrations and the like.

Preferably, the end 20 of the threaded pin 16 is rounded and engaged in abutment within a corresponding flared semicircular recess 21 formed in the timing lever 9.

Preferably, the pin 16 extends in the longitudinal direction X-X as a substantial extension of the brake lever 2 and more precisely of the tapered part 2b of the latter.

The pin 16 comprises an end preferably projecting from the part of head 2a of the brake lever 2 and being formed to substantially match the second seat of the bush, such as to provide said rotatably integral shape coupling.

Figure 14:
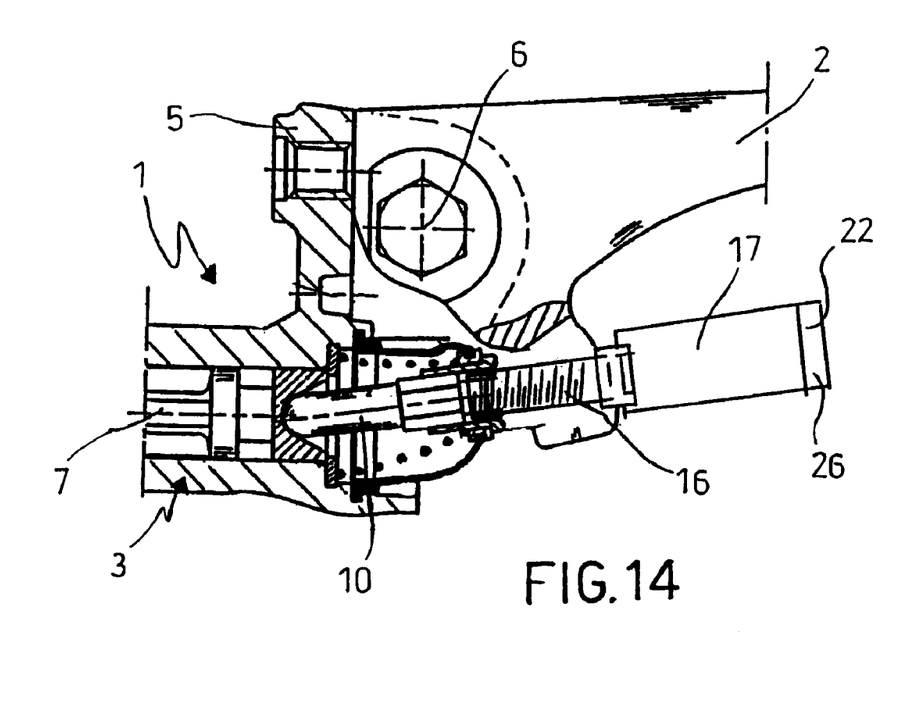
FIG. 14 is a partially sectional, plan view of a lever device according to a further embodiment of the invention.

FIG. 14 shows a further embodiment of the invention, in which the lever device is not provided with a timing lever, and the adjustment member, i.e. the threaded pin 16, is arranged between the main lever 2 and control rod 10 for the hydraulic piston 7 and is suitable to adjust the relative position between the main lever and the piston 7, and consequently, the relative position between the main lever 2 and the support 5. Also in this case, the electric actuator, which is preferably secured to the main lever 2, is suitable to transmit the actuating motion to the adjusting member 16 with the same modalities as described above relative to the embodiment shown in FIGS. 1 and 2.

It should be noted that the lever device 1 according to the invention does not require mechanical means for transmitting an adjusting movement from the manual operating member to the adjusting member and thus allows placing the manual operating member in a suitable position for a comfortable operation and with the required tactile sensibility. This is particularly advantageous for applications in the motorcycle racing field, where the tactile sensibility of a motorcyclist's finger is reduced because of the safety gloves.

The lever device 1 according to the invention further allows acting on the adjusting member by means of an actuating force independent of the manual operating force and allows carrying out the adjustment in a reliable manner with very fine steps of predefined and certain width as a function of much more coarse manual operating snaps.

Considering the above, the lever device 1 according to the invention is particularly suitable to be used on board of motorcycles used in sports races.

Further advantages of the lever device according to the invention are:

the adjustment of the rest position of the pump piston being separate from the position of the main lever;

the possibility of adopting a very precise screw adjusting system;

the simplicity of construction and consequent low manufacturing cost;

the reduction in the device overall size.

Obviously, to the lever device according to the invention as described above, those skilled in the art, aiming at satisfying contingent and specific requirements, may carry out a number of modifications and variations, all being however contemplated within the scope of protection of the invention, such as defined in the annexed claims.

For example, unlike what has been described above, the pin 16 can engage the timing lever in an axially adjustable manner along the longitudinal direction X-X, and be simultaneously engaged in abutment against the brake lever.

Unlike what has been described above, in the event that— owing to constructive options—the hydraulic actuator is placed such as to have the movable piston in the longitudinal direction X-X as defined above or another direction other than that Y-Y considered above, the timing lever requires only to have an L-shaped portion, or other equivalent shape, to effectively obtain the actuation of the hydraulic actuator.

We claim:

1. A lever device for operating a hydraulic actuator on a motorcycle, said device comprising:
   a support to be connected to a bearing structure,
   a hydraulic actuator connected to the support,
   a main lever pivotally connected to the support and intended to be operated by being moved towards or away from said hydraulic actuator,
   an adjusting member disposed between the main lever and the support, for adjusting the position of the main lever relative to the support,
   an electric actuator, comprising an electric motor, for changing the position of the adjusting member,
   a power supply for the electric actuator,
   a manual operating member interacting with the power supply so as to operate the electric actuator, and
   means for compensating for misalignment between the adjusting member and the electric actuator,
   wherein said motor has a drive shaft which is coaxial with the adjusting member and is connected to the adjusting member by a bush, said bush having a first seat that provides a rotary coupling with said drive shaft and a second seat that provides a rotary coupling with said adjusting member, wherein one of the first and second seats forms a longitudinal guide for the drive shaft or adjusting member such as to compensate for longitudinal displacements of the adjusting member relative to the drive shaft.

2. The device of claim 1, wherein the manual operating member is arranged in a position remote from that of the adjusting member.

3. The device of claim 1, further comprising a timing lever pivotally connected to said support between said support and the adjusting member of the main lever, such as to operate the hydraulic actuator when the main lever is moved towards the hydraulic actuator.

4. The device according to claim 3, wherein said electric motor is a stepping motor providing a defined step width adjustment of the position of the main lever.

5. The device according to claim 3, wherein said manual operating member comprises a selector that is manually snap-adjustable.

6. The device according to claim 5, wherein the manual operating member emits signals that represent the adjustment direction and the number of snaps carried out on the selector.

7. The device according to claim 6, further comprising a control unit connected between the manual operating member and the power supply, said control unit being suitable to control the power supply as a function of the signals received from the manual operating element.

8. The device according to claim 5, further comprising a control unit connected between the manual operating member and the power supply, said control unit being suitable to control the power supply as a function of the signals received from the manual operating element, wherein the control unit turns the signals that represent the number of snaps and adjustment direction into control signals for the power supply, such that a determined number of operating snaps corresponds to a determined number of operating steps of the stepping motor and an operating direction corresponds to a moving direction of the motor.

9. The device according to claim 3, wherein the manual operating member is arranged in an independent position remote from the position of the adjusting member.

10. The device according to claim 3, wherein said adjusting member comprises a pin that engages in an axially adjustable manner at least one of said main and timing levers and interacts with the other lever of said main lever and said timing lever.

11. The device according to claim 10, wherein said pin comprises a threaded portion and said axially adjustable engagement is provided by means of a threaded coupling.

12. The device according to claim 11, further comprising a centering support that is hinged to said one lever of said main lever and said timing lever, wherein said pin is screw-engaged with said centering support, the position of said pin being adjustable by screwing or unscrewing the pin relative to the centering support.

13. The device according to claim 12, wherein an end of said pin is abutted within a flared semicircular recess that is formed in said other of said main lever and said timing lever.

14. The device according to claim 3, wherein the timing lever comprises an abutment plane suitable to be abutted against a surface of the support to define an end-of-stroke for the rotational movement of the timing lever and main lever away from said hydraulic actuator.

15. The device according to claim 3, further comprising elastic means acting between counter-posed end portions of the main lever and timing lever to bias the main lever towards the hydraulic actuator and hold said pin in contact with said other of said levers with a preset elastic load.

16. The device according to claim 3, wherein said hydraulic actuator is operated by a control rod and wherein said lever device comprises timing means for adjusting the relative position of the timing lever relative to the control rod.

17. The device according to claim 3, wherein the compensation means comprise a pivotal support of the electric actuator, such that the orientation of the electric actuator is defined by the orientation of the adjusting member to which it is coupled.

* * * * *